(12) United States Patent
Kalchbrenner et al.

(10) Patent No.: US 10,482,373 B1
(45) Date of Patent: Nov. 19, 2019

(54) GRID LONG SHORT-TERM MEMORY NEURAL NETWORKS

(71) Applicant: DeepMind Technologies Limited, London (GB)

(72) Inventors: Nal Emmerich Kalchbrenner, London (GB); Ivo Danihelka, London (GB); Alexander Benjamin Graves, London (GB)

(73) Assignee: DeepMind Technologies Limited, London (GB)

( * ) Notice: Subject to any disclaimer, the term of this patent is extended or adjusted under 35 U.S.C. 154(b) by 836 days.

(21) Appl. No.: 15/174,806

(22) Filed: Jun. 6, 2016

Related U.S. Application Data

(60) Provisional application No. 62/172,011, filed on Jun. 5, 2015.

(51) Int. Cl.
*G06N 3/04* (2006.01)

(52) U.S. Cl.
CPC ............. *G06N 3/0445* (2013.01); *G06N 3/04* (2013.01)

(58) Field of Classification Search
None
See application file for complete search history.

(56) References Cited

PUBLICATIONS

Graves, "Supervised Sequence Labelling with Recurrent Neural Networks," vol. 385 of Studies in Computational Intelligence, Springer 2012 [online] (retrieved from https://www.cs.toronto.edu/~graves/preprint.pdf), 137 pages.

Graves and Schmidhuber, "Offline Handwriting Recognition with Multidimensional Recurrent Neural Networks," In Advances in Neural Information Processing Systems, vol. 21, 2008 [online] (retrieved from http://papers.nips.cc/paper/3449-offline-handwriting-recognition-with-multidimensional-recurrent-neural-networks.pdf), 8 pages.

Graves et al., "Multi-dimensional Recurrent Neural Networks," (May 14, 2007) [online] (retrieved from https://arxiv.org/pdf/0705.2011v1.pdf), 10 pages.

Graves et al., "Speech Recognition with Deep Recurrent Neural Networks," (Mar. 22, 2013) [online] (retrieved from https://arxiv.org/pdf/1303.5778v1.pdf), 5 pages.

Graves, "Generating Sequences with Recurrent Neural Networks," (Jun. 5, 2014) [online] (retrieved from http://arxiv.org/pdf/1308.0850.pdf), 43 pages.

(Continued)

*Primary Examiner* — Scott A. Waldron
*Assistant Examiner* — Casey R. Garner
(74) *Attorney, Agent, or Firm* — Fish & Richardson P.C.

(57) ABSTRACT

Methods, systems, and apparatus, including computer programs encoded on computer storage media, for implementing grid Long Short-Term Memory (LSTM) neural networks that includes a plurality of N-LSTM blocks arranged in an N-dimensional grid. Each N-LSTM block is configured to: receive N input hidden vectors, the N input hidden vectors each corresponding to a respective one of the N dimensions; receive N input memory vectors, the N input memory vectors each corresponding to a respective one of the N dimensions; and, for each of the dimensions, apply a respective transform for the dimension to the memory hidden vector corresponding to the dimension and the input hidden vector corresponding to the dimension to generate a new hidden vector corresponding to the dimension and a new memory vector corresponding to the dimension.

20 Claims, 7 Drawing Sheets

(56) References Cited

PUBLICATIONS

Srivastava et al., "Highway Networks," (Nov. 3, 2015) [online] (retrieved from https://arxiv.org/pdf/1505.00387v2.pdf), 6 pages.
Sutskever et al., "Sequence to Sequence Learning with Neural Networks," In Advances in Neural Information Processing Systems, 2014 [online] (retrieved from https://papers.nips.cc/paper/5346-sequence-to-sequence-learning-with-neural-networks.pdf), 9 pages.
Visin et al., "ReNet: A Recurrent Neural Network Based Alternative to Convolutional Networks," (Jul. 23, 2015) [online] (retrieved from https://arxiv.org/pdf/1505.00393.pdf), 9 pages.

GRID LONG SHORT-TERM MEMORY NEURAL NETWORKS

CROSS-REFERENCE TO RELATED APPLICATION

This application claims priority to U.S. Provisional Application No. 62/172,011, filed on Jun. 5, 2015. The disclosure of the prior application is considered part of and is incorporated by reference in the disclosure of this application.

BACKGROUND

This specification relates to neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM cells that each include an input gate, a forget gate, and an output gate that allow the cell to store previous states for the cell, e.g., for use in generating a current activation or to be provided to other components of the LSTM neural network.

SUMMARY

This specification describes technologies that relate to neural network architectures. In general, a grid Long Short-Term Memory (LSTM) neural network includes multiple N-LSTM blocks arranged in an N-dimensional grid. Each N-LSTM block is configured to, for each of the N dimensions, receive (i) an input hidden vector for the dimension and (ii) an input memory vector for the dimension and, for each of the N dimensions, apply a transform to the input hidden vector for the dimension and the input memory vector for the dimension to determine a new hidden vector and a new memory vector for the dimension.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. A neural network system implementing a grid LSTM neural network as described in this specification effectively modulates N-way communication between the N-LSTM blocks in the grid LSTM neural network, allowing the grid LSTM neural network to be effectively used for both deep and sequential computation. In particular, as the number of paths in the grid grows combinatorically with the size of each dimension and the total number of dimensions N, the values in memory vectors passed between N-LSTM blocks are prevented from growing at the same rate. Depending on the value of N and because of the effective modulation of the communication, the grid LSTM neural network can be effectively applied to input vectors, input sequences, or higher dimensional data such as images. Within a given N-LSTM block, the architecture of the block ensures that the hidden and memory vectors from the different dimensions will interact closely without being conflated, resulting in improved performance on machine learning tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
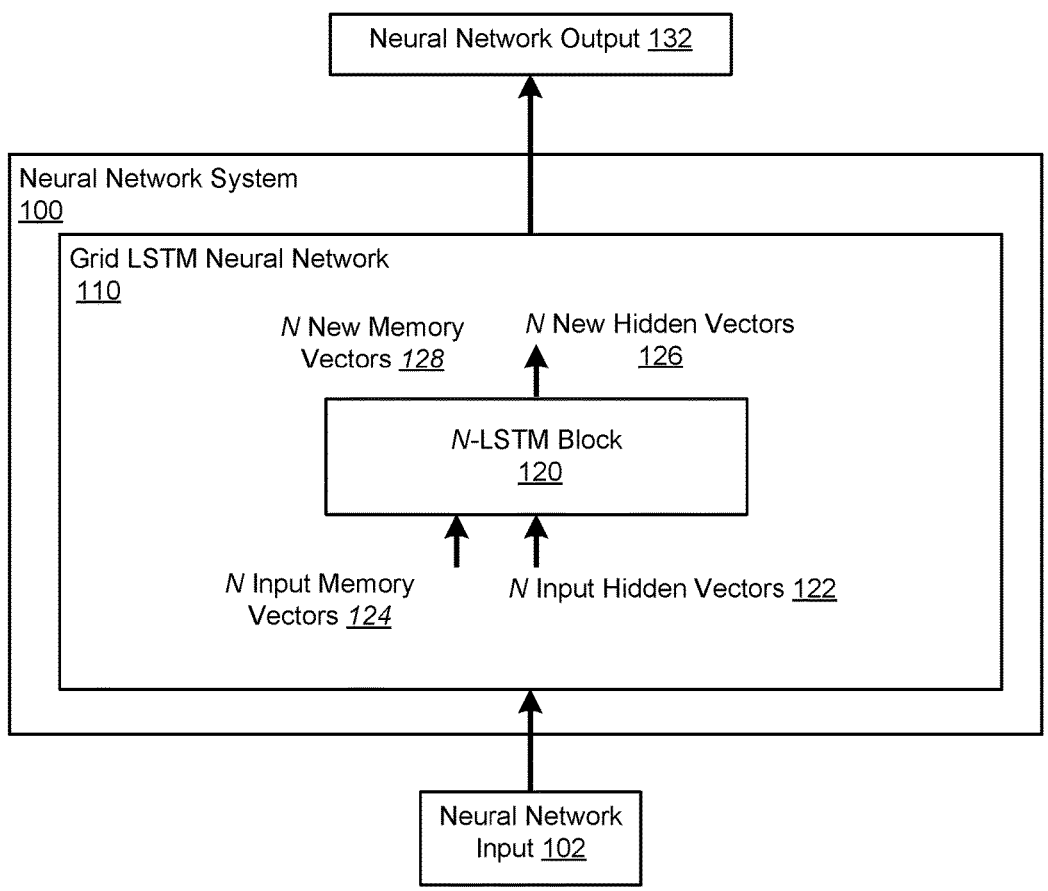
FIG. 1 shows an example neural network system.

FIG. 1 shows an example neural network system 100. The neural network system 100 is an example of a system implemented as computer programs on one or more computers in one or more locations, in which the systems, components, and techniques described below are implemented.

The neural network system 100 is a machine learning system that receives a neural network input 102 and generates a neural network output 132 from the neural network input 102.

The neural network system 100 can store the generated neural network output 132 in an output data repository or provide the neural network outputs for use for some other immediate purpose, e.g., for presentation to a user in a user interface of a user device. The user device may be located remotely from the neural network system 100 and the system 100 may transmit the neural network output 132 over a data communication network for presentation on the user device or the user device may be one of the one or more computers on which the neural network system 100 is implemented.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item. In some of these examples, the neural network system 100 is part of a reinforcement learning system that provides content recommendations to users.

As another example, if the input to the neural network system 100 is a sequence of text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is a sequence of features of a spoken utterance, the output generated by the neural network system 100 may be a score for each of a set of pieces of text, each score representing an estimated likelihood that the piece of text is the correct transcription for the utterance.

As another example if the inputs to the neural network system 100 are images, the output generated by the neural network system 100 may be a score for each of a set of pieces of text, each score representing an estimated likelihood that the piece of text is text that is present in the input image.

In particular, the neural network system 100 includes a grid Long Short-Term Memory (LSTM) neural network 110. The grid LSTM neural network 110 includes multiple N-LSTM blocks arranged in an N-dimensional grid, where N is an integer greater than or equal to 1.

Each N-LSTM block in the grid is configured to, for each of the N dimensions, receive (i) an input hidden vector for the dimension and (ii) an input memory vector for the dimension and, for each of the N dimensions, apply a transform to the input hidden vector for the dimension and the input memory vector for the dimension to determine a new hidden vector and a new memory vector for the dimension.

For example, an N-LSTM block 120 in the grid LSTM neural network 110 is configured to receive N input hidden vectors 122 and N input memory vectors 124. The N-LSTM block 120 is then configured to, for each of the N dimensions, apply a transform to the input hidden vector for the dimension and the input memory vector for the dimension to determine N new hidden vectors 126 and N new memory vectors 128. Generating new hidden vectors and new memory vectors is described in more detail below with reference to FIGS. 3-5.

As will be described in more detail below, in order to cause the grid LSTM neural network 110 to generate a neural network output for the neural network input 102, the neural network system 100 provides all of or a portion of the neural network input 102 as the input hidden vector, the input memory vector, or both for one or more predetermined dimensions to a predetermined subset of the N-LSTM blocks in the grid. In particular, the neural network system 100 can provide all of or a portion of the neural network input 102 as input to the N-LSTM blocks that are first in the grid along the one or more predetermined dimensions.

Once generated, each N-LSTM block is configured to provide the new hidden vector and the new memory vector generated by the N-LSTM block for a given dimension as input to the next N-LSTM block along that dimension in the grid unless the N-LSTM block is the last N-LSTM block in the grid along that dimension.

In some implementations, the neural network output 132 is made up of the new memory vectors, the new hidden vectors, or both for a particular dimension generated by one or more predetermined N-LSTM blocks in the grid, e.g., the last N-LSTM in the grid along the particular dimension.

In some other implementations, the grid LSTM neural network layer 110 also includes an output layer, e.g., a softmax layer or a logistic regression classifier layer, that is configured to receive the new memory vectors, the new hidden vectors, or both for the particular dimension generated by the one or more predetermined N-LSTM blocks and to process the received input to generate the neural network output 132.

Figure 2A:
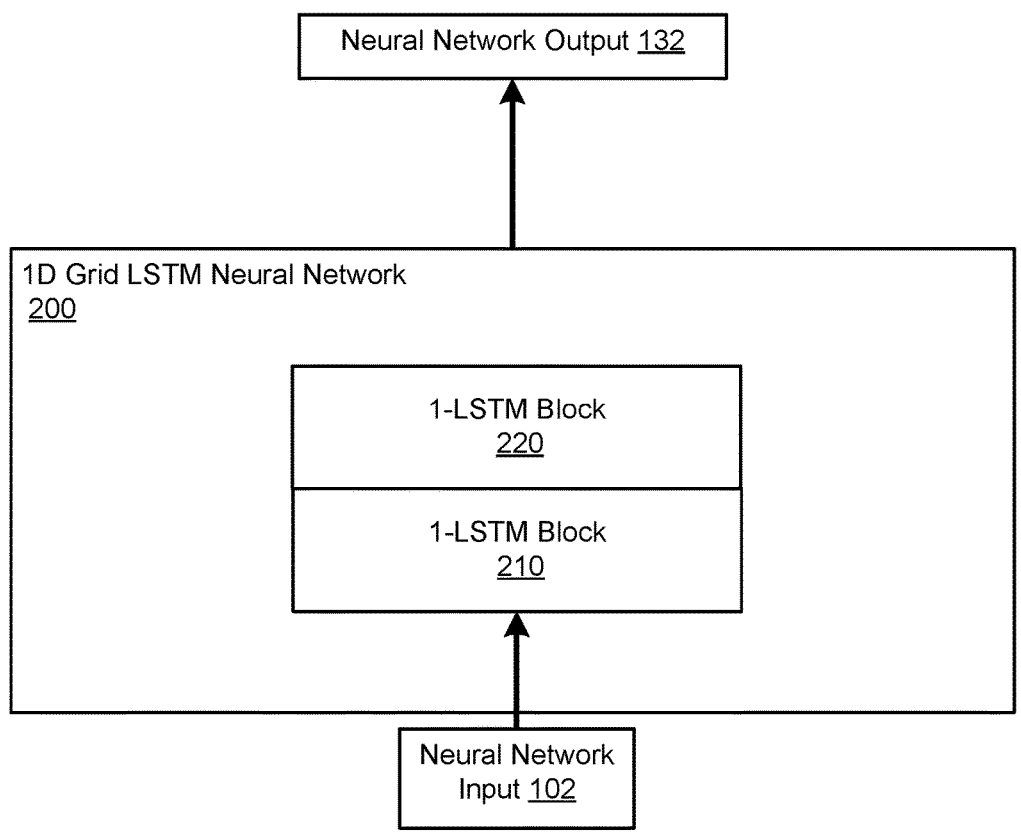
FIG. 2A shows an example 1D grid LSTM neural network.

FIG. 2A shows an example 1D Grid LSTM neural network 200 that includes two 1-LSTM blocks 210 and 220 arranged in a one-dimensional grid, i.e., stacked one on top of the other. While the example of FIG. 2A shows two 1-LSTM blocks, the one-dimensional grid may include any number of 1-LSTM blocks.

In the example of FIG. 2A, each of the 1-LSTM blocks 210 and 220 receives a single input memory vector and a single input hidden vector and applies a transform to the input memory vector and the input hidden vector to generate a single new input memory vector and a single new input hidden vector. In particular, the input hidden vector and the input memory vector to the 1-LSTM block 210 may be the neural network input 102, and the input hidden vector and the input memory vector to the 1-LSTM block 220 may be the new input memory vector and the new input hidden vector generated by the 1-LSTM block 210. The new input memory vector, the new input hidden vector, or both generated by the 1-LSTM block 220 may be used as the neural network output 132 or may be provided to an output layer for use in generating the neural network output 132.

Figure 2B:
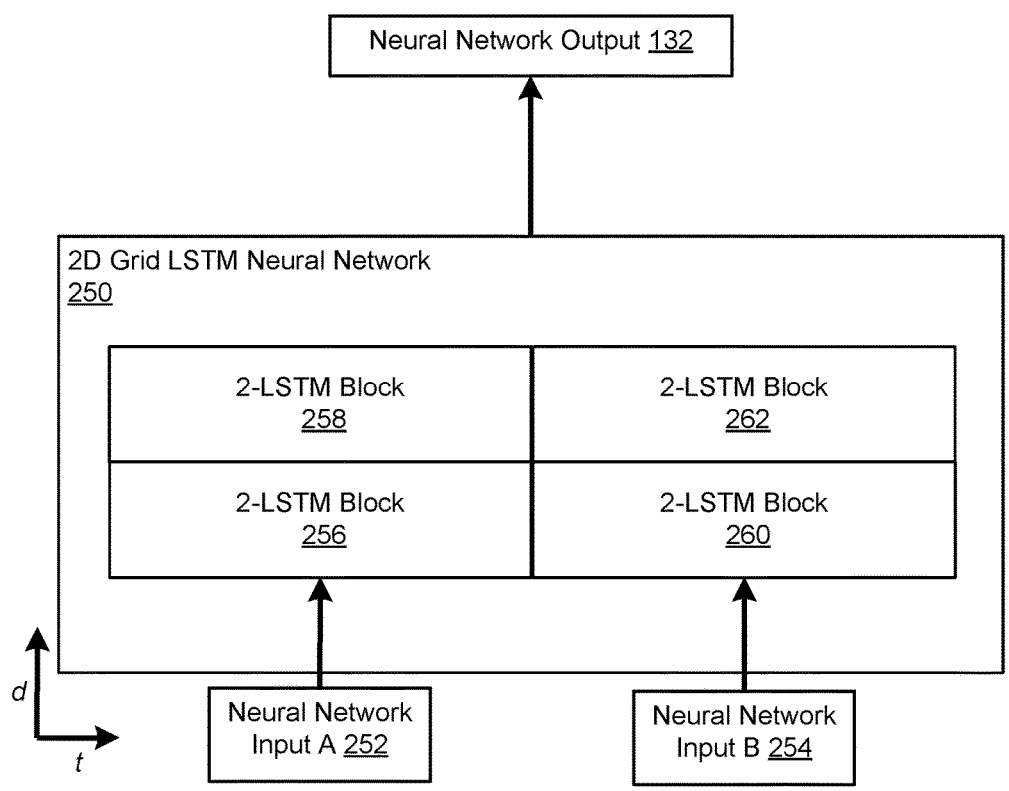
FIG. 2B shows an example 2D grid LSTM neural network.

FIG. 2B shows an example 2D Grid LSTM neural network 250. The 2D Grid LSTM neural network 250 includes multiple 2-LSTM blocks arranged in a 2-dimensional grid.

In particular, the 2-dimensional grid is a 2×2 grid, having two 2-LSTM blocks along a dimension t, which may be conceptualized as a time dimension for processing neural network inputs that are sequences, and two 2-LSTM blocks along a dimension d, which may be conceptualized as a depth dimension representing the depth of computation for each input in the sequence.

In the example of FIG. 2B, the neural network input 102 is a sequence made up of an input A 252 followed by an input B 254. Accordingly, the input A 252 is provided as the input hidden vector, the input memory vector, or both to the 2-LSTM block 256 along the d dimension, while the input B 254 is provided as the input hidden vector, the input memory vector, or both to the 2-LSTM block 260 along the d dimension.

The new memory vector and the new hidden vector generated by the 2-LSTM block 256 along the d dimension are provided as the input memory and hidden vectors along the d dimension to a 2-LSTM block 258, while the new memory vector and the new hidden vector generated by the 2-LSTM block 256 along the t dimension are provided as the input memory and hidden vectors along the t dimension to the 2-LSTM block 260.

Similarly, a 2-LSTM block 262 receives as input hidden and memory vectors along the d dimension the new memory and hidden vectors generated by the 2-LSTM block 260 for the d dimension and as input memory and hidden vectors along the t dimension the new memory and hidden vectors generated by the 2-LSTM block 258 for the t dimension. As an example, the new hidden and memory vectors generated by the 2-LSTM block 262 along the d dimension may be used by an output layer to generate the neural network output 132 for the neural network input 102, while the remainder of the new hidden and memory vectors are discarded.

Figure 2C:
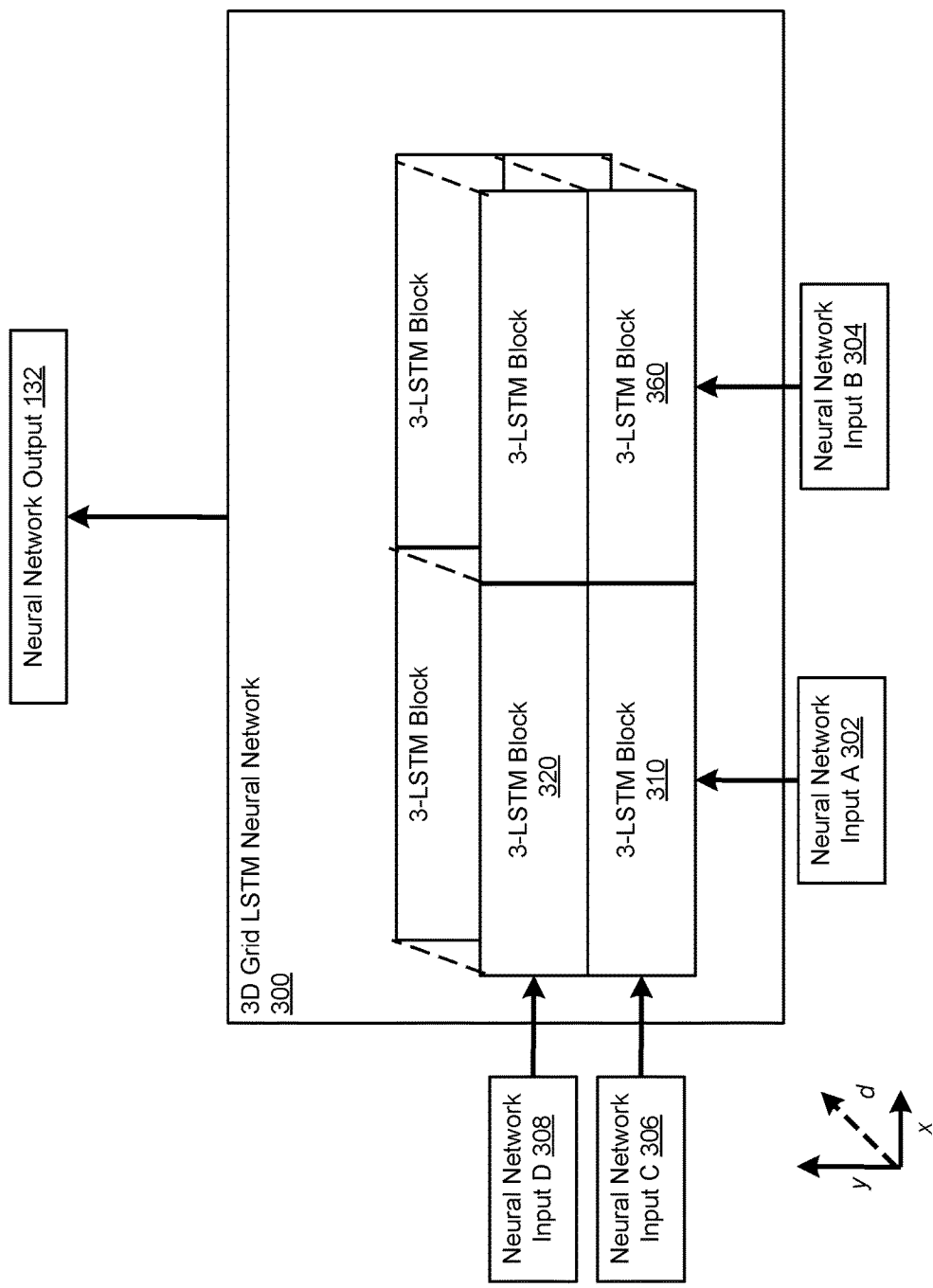
FIG. 2C shows an example 3D grid LSTM neural network.

FIG. 2C shows an example 3D Grid LSTM neural network 300. The 3D Grid LSTM neural network 300 includes multiple 3-LSTM blocks arranged in a 3-dimensional grid.

In particular, the 3D Grid LSTM neural network 300 is configured to process neural network inputs having multiple inputs along an x dimension, e.g., neural network inputs A 302 and neural network inputs B 304, and multiple inputs along a y dimension, e.g., neural network inputs C 306 and neural network inputs D 308, with computation depth d. Thus, the 3-dimensional grid is a 2×2×2 grid, having two 3-LSTM blocks along the dimension x, two 3-LSTM blocks along the dimension y, and two 3-LSTM blocks along the dimension d. While the numbers of blocks along each dimension is shown as equal in the example of FIG. 2C, different number of blocks can be arranged along the different dimensions.

Accordingly, in the example of FIG. 2C, a 3-LSTM Block 310 is configured to receive the neural network input A 302 as the input hidden vector, the input memory vector, or both to the block along they dimension, and the neural network input C 306 as the input hidden vector, the input memory vector, or both to the block along the x dimension. Similarly, the 3-LSTM block 320 is configured to receive the neural network input D 308 as the input hidden vector, the input memory vector, or both to the block along the x dimension, while the 3-LSTM block 360 is configured to receive the neural network input B 304 as the input hidden vector, the input memory vector, or both to the block along they dimension.

Figure 3:
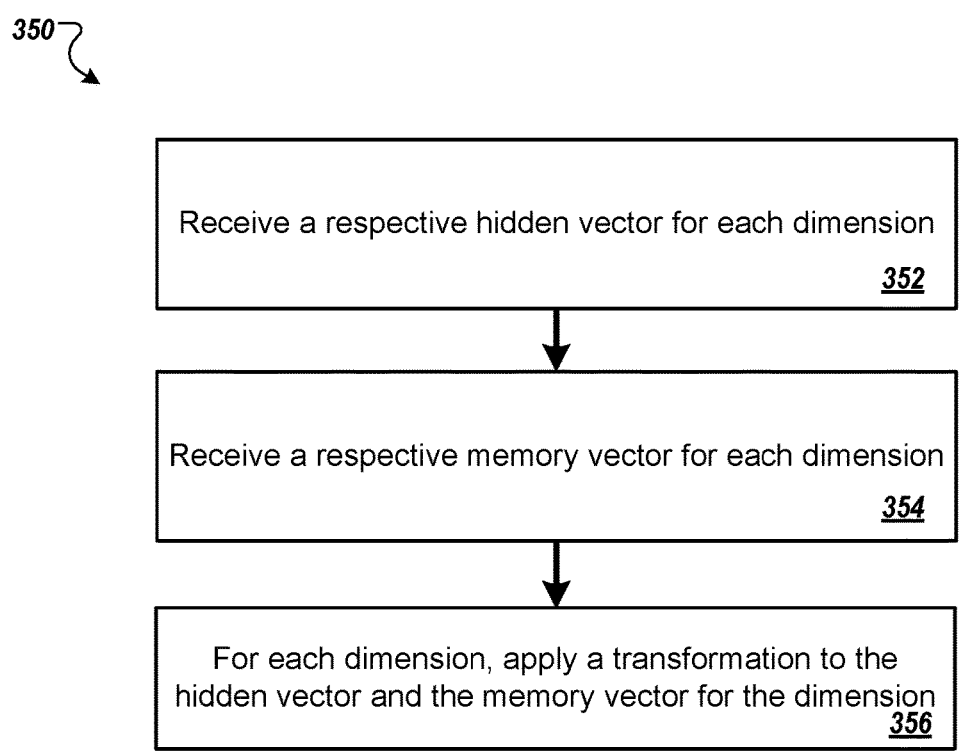
FIG. 3 is a flow diagram of an example process for processing an input to an N-LSTM block.

FIG. 3 is a flow diagram of an example process 350 for processing an input to an N-LSTM block For convenience, the process 350 will be described as being performed by an N-LSTM block implemented by a system of one or more computers located in one or more locations. For example, an N-LSTM block in a neural network system, e.g., the N-LSTM block 120 of the neural network system 100 of FIG. 1, appropriately programmed in accordance with this specification, can perform the process 350.

The N-LSTM block receives a respective input hidden vector for each of the N dimensions (step 352). That is, the N-LSTM block receives N input hidden vectors, with each hidden vector corresponding to a different one of the N dimensions. Depending on the position of the N-LSTM block within the grid LSTM neural network, the input hidden vector for a given dimension may be a hidden vector generated by another N-LSTM block, some or all of the neural network input, or a placeholder input hidden vector that is predetermined or learned through training.

The N-LSTM block receives a respective input memory vector for each of the N dimensions (step 354). That is, the N-LSTM block receives N input memory vectors, with each memory vector corresponding to a different one of the N dimensions. Depending on the position of the N-LSTM block within the grid LSTM neural network, the input memory vector for a given dimension may be a memory vector generated by another N-LSTM block, some or all of the neural network input, or a placeholder input memory vector that is predetermined or learned through training.

For each dimension, the N-LSTM block applies a transform to the input hidden vector and the input memory vector for the dimension to generate a new hidden vector and a new memory vector for the dimension (step 356).

Generally, the N-LSTM block generates a concatenated hidden vector for each dimension and applies the transform for the dimension to the concatenated hidden vector and the input memory vector for the dimension.

For at least some of the dimensions, the N-LSTM block generates the concatenated hidden vector by concatenating the N input hidden vectors. In some implementations, however, for a predetermined one of the dimensions, the N-LSTM block is configured to generate the concatenated hidden vector by concatenating the input hidden vector for the dimension and the new hidden vectors for each of the other dimensions. That is, the N-LSTM block is configured to first apply the transform in each dimension other than the predetermined dimension to generate the new hidden vectors for the other dimensions and then generate the concatenated hidden vector for the predetermined dimension using the input hidden vector for the dimension and the generated new hidden vectors for the other dimensions.

In some implementations, the transform for each dimension is an LSTM transform. Applying an LSTM transform to the concatenated hidden vector and the input memory vector for a given dimension is described in more detail below with reference to FIG. 4. In some other implementations, for one or more predetermined dimensions, rather than apply an LSTM transform, the N-LSTM block is configured to instead apply a non-LSTM transform to the concatenated hidden vector for the predetermined dimension. For example, the non-LSTM transform may consist of processing the concatenated hidden vector using a conventional fully-connected neural network layer with or without an activation function to generate the new hidden vector for the predetermined dimension.

Depending on the position of the N-LSTM block within the grid LSTM neural network, the new memory vector and the new hidden vector generated by the N-LSTM block for a given dimension can either be discarded, used as some or all of the neural network output, provided to an output layer, or provided to another N-LSTM block.

In particular, if the N-LSTM block is not the last N-LSTM block in the grid along a given dimension, the N-LSTM block provides the new hidden vector and the new memory vector for the given dimension to the next N-LSTM block along the given dimension for use as the input hidden vector and the input memory vector for that N-LSTM block for the given dimension.

If the N-LSTM block is the last N-LSTM block in the grid along a given dimension, the N-LSTM block can be configured to (i) discard the new hidden vector and the new memory vector, i.e., if the vectors generated for the given dimension are not to be used in generating the neural network output, (ii) provide the new hidden vector, the new memory vector, or both as some or all of the neural network output, (iii) provide the new hidden vector, the new memory vector or both, to an output layer of the grid LSTM neural network for use in generating the neural network output, or (iv) provide the new hidden vector and the new memory vector as input to another N-LSTM block along a different dimension. In some implementations, when the grid LSTM neural network includes an output layer, the output layer is configured to receive as input not only the new hidden vector, the new memory vector or both generated by the last N-LSTM block in the grid along a given dimension, but also the new hidden vector, the new memory vector or both for the given dimension generated by one or more other N-LSTM blocks that are not last in the grid along the given dimension.

Figure 4:
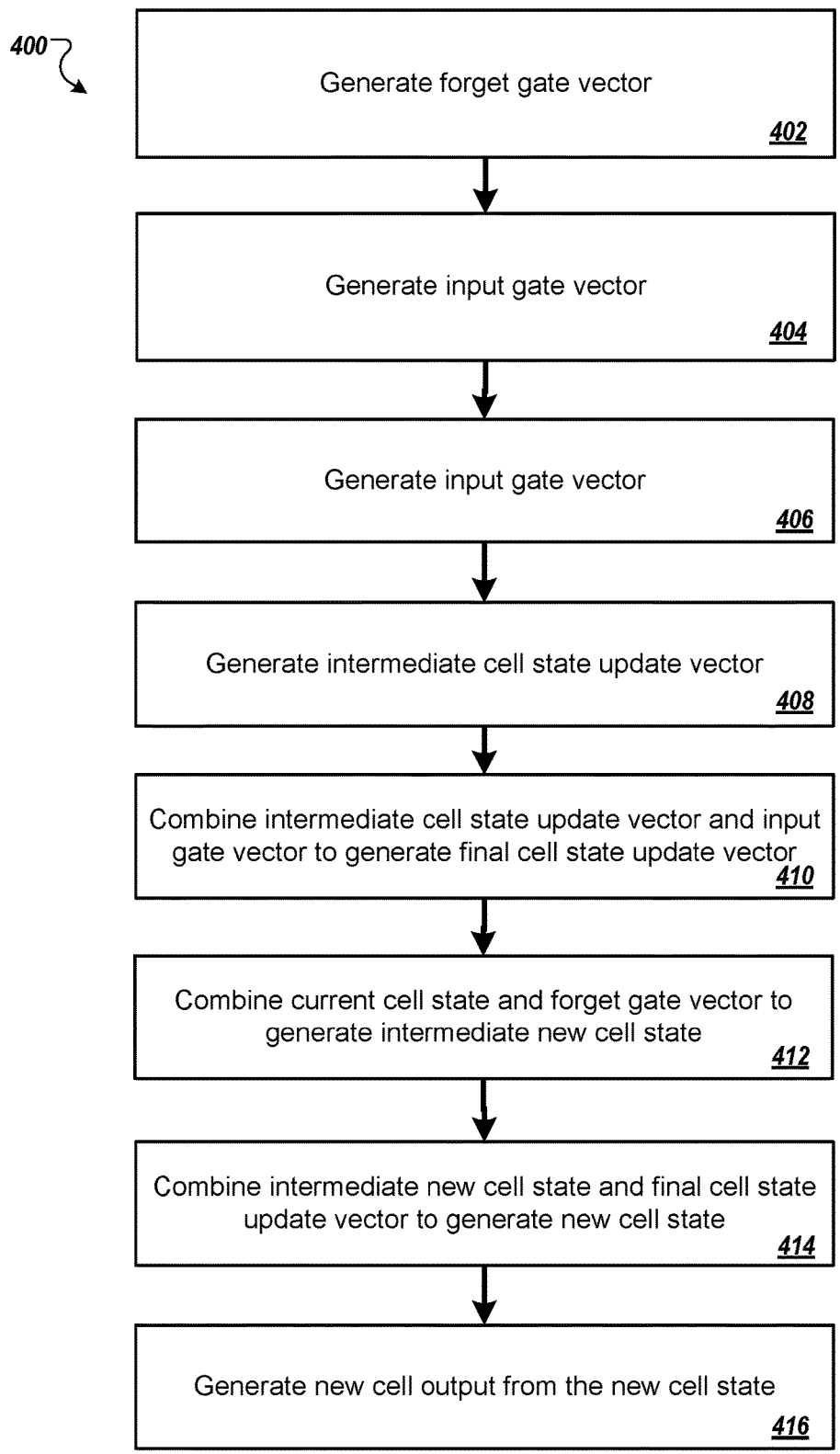
FIG. 4 is a flow diagram of an example process for applying an LSTM transform to a hidden vector and a memory vector for a given dimension.

FIG. 4 is a flow diagram of an example process 400 for applying an LSTM transform to a hidden vector and a memory vector for a given dimension. For convenience, the process 400 will be described as being performed by an N-LSTM block implemented by a system of one or more computers located in one or more locations. For example, an N-LSTM block in a neural network system, e.g., the N-LSTM block 120 of the neural network system 100 of FIG. 1, appropriately programmed in accordance with this specification, can perform the process 400.

The N-LSTM block generates a forget gate vector from the concatenated hidden vector for the dimension (step 402). Generating a gate vector from a concatenated hidden vector will be described in more detail below with reference to FIG. 5.

The N-LSTM block generates an input gate vector from the concatenated hidden vector for the dimension (step 404). Generating a gate vector from a concatenated hidden vector will be described in more detail below with reference to FIG. 5.

In some implementations, instead of generating an input gate vector separately from generating the forget gate vector, the system uses a forget gate vector that is equal to one minus the input gate vector. That is, in some implementations, the input gate is the same as the forget gate.

The N-LSTM block generates an output gate vector from the concatenated hidden vector for the dimension (step 406). Generating a gate vector from a concatenated hidden vector will be described in more detail below with reference to FIG. 5.

The N-LSTM block generates an intermediate memory vector update vector from the concatenated hidden vector (step 408). In particular, the N-LSTM block processes the concatenated hidden vector using a neural network layer having an activation function that is a squashing function to generate the intermediate memory vector update vector.

Generally, a squashing function is a function that maps received inputs to a range of −1 to 1, exclusive. For example, the squashing function may be the hyperbolic tangent function. For example, the neural network layer may be a layer that performs a matrix multiplication between a parameter matrix and the concatenated hidden vector, optionally adds a bias vector to the product, and then applies the saturating squashing function to each component of either the resulting vector or of the product if no bias vector is applied.

The N-LSTM block combines the intermediate memory vector update vector and the input gate vector to generate a final memory vector update vector (step 410). In particular, the N-LSTM block computes a point-wise multiplication between the intermediate memory vector update vector and the input gate vector to generate the final memory vector update vector.

The N-LSTM block combines the input memory vector for the dimension and the forget gate vector to generate an intermediate new memory vector (step 412). In particular, the N-LSTM block computes a point-wise multiplication between the input memory vector for the dimension and the forget vector to generate the intermediate new memory vector.

The N-LSTM block combines, e.g., sums, the intermediate new memory vector and the final memory vector update vector to generate a final new memory vector for the dimension (step 414).

The N-LSTM block generates a new hidden vector for the dimension from the final new memory vector for the dimension (step 416).

To generate the new hidden vector, the N-LSTM block combines the output gate vector and the final new memory vector for the dimension to generate an intermediate new hidden vector. In particular, the N-LSTM block performs a pointwise multiplication between the output gate vector and the final new memory vector to generate the intermediate new hidden vector. The N-LSTM block then applies a squashing function to the intermediate new hidden vector to generate the final new hidden vector for the dimension.

Figure 5:
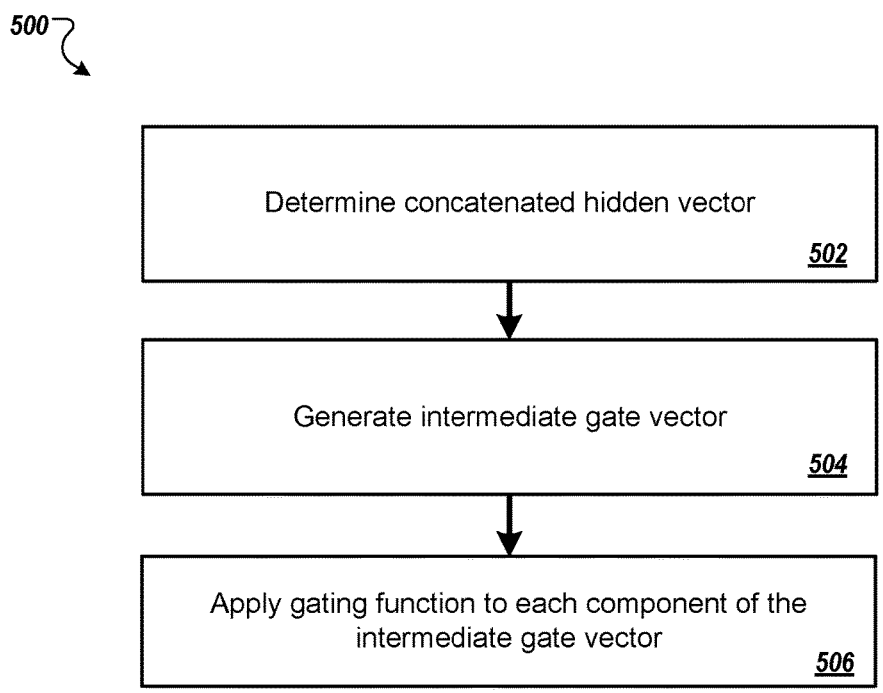
FIG. 5 is a flow diagram of an example process for generating a gate vector from a concatenated hidden vector.

FIG. 5 is a flow diagram of an example process 500 for generating a gate vector from a concatenated hidden vector. For convenience, the process 500 will be described as being performed by an N-LSTM block implemented by a system of one or more computers located in one or more locations. For example, an N-LSTM block in a neural network system, e.g., the N-LSTM block 120 of the neural network system 100 of FIG. 1, appropriately programmed in accordance with this specification, can perform the process 500.

The N-LSTM block determines the concatenated hidden vector for the dimension, e.g., as described above (step 502).

The N-LSTM block generates a respective intermediate gate vector from the concatenated hidden vector in accordance with a set of parameters (step 504). In some implementations, the N-LSTM block performs a matrix multiplication between a parameter matrix and the concatenated hidden vector and then optionally adds a bias vector to the output of the matrix multiplication to generate the intermediate gate vector, with each of the gates having different parameter matrices and bias vectors. That is, in implementations where the N-LSTM block has a distinct input gate, forget gate, and output gate, each of these gates will have different parameter matrices and bias vectors from each other gate.

Additionally, each dimension generally has different parameter matrices from the other dimensions for a given N-LSTM block. In some implementations, however, constraints can be imposed so that parameter matrices are shared along one or more of the dimensions across multiple N-LSTM blocks in the grid LSTM neural network, e.g., to induce invariance in the computation along that dimension.

The N-LSTM block applies a gating function to each component of the respective intermediate gate vector to generate a final gate vector (step 506).

Generally, a gating function is a function that maps received inputs to a range of 0 to 1, exclusive. For example, a gating function may be the sigmoid function.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for processing a neural network input to generate a neural network output, the system comprising:
   a grid Long Short-Term Memory (LSTM) neural network implemented by one or more computers, wherein the grid LSTM neural network comprises a plurality of N-LSTM blocks arranged in an N-dimensional grid, wherein N is an integer greater than zero, and wherein each N-LSTM block is configured to:
   receive N input hidden vectors, the N input hidden vectors each corresponding to a respective one of the N dimensions;
   receive N input memory vectors, the N input memory vectors each corresponding to a respective one of the N dimensions; and
   for each of the dimensions, apply a respective transform for the dimension to the memory hidden vector corresponding to the dimension and the input hidden vector corresponding to the dimension to generate a new hidden vector corresponding to the dimension and a new memory vector corresponding to the dimension.

2. The system of claim 1, wherein for each of the dimensions, applying a respective transform comprises:
   generating a concatenated hidden vector for the dimension; and
   applying the respective transform for the dimension to the concatenated hidden vector for the dimension.

3. The system of claim 2, wherein, for one or more of the dimensions, the concatenated hidden vector is a concatenation of the N input hidden vectors.

4. The system of claim 2, wherein, for one or more of the dimensions, the concatenated hidden vector is a concatenation of the input hidden vector for the dimension and the new hidden vectors for each other dimension.

5. The system of claim 2, wherein, for one or more of the dimensions, applying the respective transform comprises applying a LSTM transform.

6. The system of claim 2, wherein, for one or more of the dimensions, applying the respective transform comprises applying a non-LSTM transform.

7. The system of claim 1, wherein, for a first N-LSTM block of the plurality of N-LSTM blocks, the input hidden vector and the input memory vector corresponding to a particular dimension are at least a portion of the neural network input.

8. The system of claim 7, wherein the grid LSTM neural network further comprises an output layer configured to:
   process the new hidden vector and the new memory vector corresponding to the particular dimension and generated by a second N-LSTM block of the plurality of N-LSTM blocks to generate the neural network output.

9. The system of claim 1, wherein N is 1.

10. The system of claim 1, wherein N is 2.

11. The system of claim 1, wherein N is 3.

12. The system of claim 1, wherein N is greater than 1.

13. One or more non-transitory computer storage media storing instructions that when executed by one or more computers cause the one or more computers to implement:
    a grid Long Short-Term Memory (LSTM) neural network, wherein the grid LSTM neural network comprises a plurality of N-LSTM blocks arranged in an N-dimensional grid, wherein N is an integer greater than zero, and wherein each N-LSTM block is configured to:
    receive N input hidden vectors, the N input hidden vectors each corresponding to a respective one of the N dimensions;
    receive N input memory vectors, the N input memory vectors each corresponding to a respective one of the N dimensions; and
    for each of the dimensions, apply a respective transform for the dimension to the memory hidden vector corresponding to the dimension and the input hidden vector corresponding to the dimension to generate a new hidden vector corresponding to the dimension and a new memory vector corresponding to the dimension.

14. The one or more non-transitory computer storage media of claim 13, wherein for each of the dimensions, applying a respective transform comprises:
    generating a concatenated hidden vector for the dimension; and
    applying the respective transform for the dimension to the concatenated hidden vector for the dimension.

15. The one or more non-transitory computer storage media of claim 14, wherein, for one or more of the dimensions, the concatenated hidden vector is a concatenation of the N input hidden vectors.

16. The one or more non-transitory computer storage media of claim 14, wherein, for one or more of the dimensions, the concatenated hidden vector is a concatenation of the input hidden vector for the dimension and the new hidden vectors for each other dimension.

17. The one or more non-transitory computer storage media of claim 14, wherein, for one or more of the dimensions, applying the respective transform comprises applying a LSTM transform.

18. The one or more non-transitory computer storage media of claim 13, wherein, for a first N-LSTM block of the plurality of N-LSTM blocks, the input hidden vector and the input memory vector corresponding to a particular dimension are at least a portion of a neural network input.

19. The one or more non-transitory computer storage media of claim 18, wherein the grid LSTM neural network further comprises an output layer configured to:
  process the new hidden vector and the new memory vector corresponding to the particular dimension and generated by a second N-LSTM block of the plurality of N-LSTM blocks to generate a neural network output.

20. A method for processing a neural network input to generate a neural network output by processing the neural network input using a grid Long Short-Term Memory (LSTM) neural network, wherein the grid LSTM neural network comprises a plurality of N-LSTM blocks arranged in an N-dimensional grid, wherein N is an integer greater than zero, and wherein the method comprises, for each N-LSTM block:
  receiving N input hidden vectors, the N input hidden vectors each corresponding to a respective one of the N dimensions;
  receiving N input memory vectors, the N input memory vectors each corresponding to a respective one of the N dimensions; and
  for each of the dimensions, applying a respective transform for the dimension to the memory hidden vector corresponding to the dimension and the input hidden vector corresponding to the dimension to generate a new hidden vector corresponding to the dimension and a new memory vector corresponding to the dimension.

* * * * *